United States Patent
Faruque et al.

(10) Patent No.: US 11,052,857 B2
(45) Date of Patent: Jul. 6, 2021

(54) VEHICLE SEAT ASSEMBLY

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 16/450,257

(22) Filed: Jun. 24, 2019

(65) Prior Publication Data

US 2020/0398781 A1 Dec. 24, 2020

(51) Int. Cl.

| B60R 21/18 | (2006.01) |
|---|---|
| B60R 22/34 | (2006.01) |
| B60R 22/20 | (2006.01) |
| B60N 2/90 | (2018.01) |
| B60R 21/231 | (2011.01) |
| B60R 21/233 | (2006.01) |

(52) U.S. Cl.
CPC .............. B60R 21/18 (2013.01); B60N 2/90 (2018.02); B60R 21/231 (2013.01); B60R 21/233 (2013.01); B60R 22/20 (2013.01); B60R 22/34 (2013.01); *B60R 2021/23107* (2013.01); *B60R 2022/207* (2013.01); *B60R 2022/3424* (2013.01)

(58) Field of Classification Search
CPC .............. B60R 2022/027; B60R 21/18; B60R 2022/3424; B60R 2022/207
See application file for complete search history.

(56) References Cited

U.S. PATENT DOCUMENTS

| 3,888,503 | A | 6/1975 | Hamilton | |
|---|---|---|---|---|
| 3,905,615 | A | 9/1975 | Schulman | |
| 5,474,326 | A * | 12/1995 | Cho | B60R 21/18 280/733 |
| 6,705,641 | B2 | 3/2004 | Schneider et al. | |
| 6,729,693 | B2 | 5/2004 | Soderstrom et al. | |
| 6,817,629 | B2 * | 11/2004 | Herberg | B60R 22/02 280/801.1 |
| 7,904,997 | B2 * | 3/2011 | Foubert | A44B 11/2526 24/631 |

(Continued)

FOREIGN PATENT DOCUMENTS

| JP | 2006096168 A | * | 4/2006 | |
|---|---|---|---|---|
| JP | 4986808 B2 | * | 7/2012 | |
| WO | WO-2008120417 A1 | * | 10/2008 | B60R 21/18 |

OTHER PUBLICATIONS

Machnine language translation of WO 2008 120417 obtained from espacenet.com on Mar. 9, 2021.*

*Primary Examiner* — Ruth Ilan
(74) *Attorney, Agent, or Firm* — Frank A. MacKenzie; Bejin Bieneman PLC

(57) ABSTRACT

An assembly includes a belt and one of a buckle or a clip. The belt has a first inflatable portion inflatable to an inflated position, a second inflatable portion inflatable to an inflated position, and an intermediate portion between the first inflatable portion and the second inflatable portion. The intermediate portion includes a fluid channel connecting the first inflatable portion to the second inflatable portion. One of the buckle or the clip is slidably attached to the intermediate portion.

20 Claims, 5 Drawing Sheets

(56) References Cited

U.S. PATENT DOCUMENTS

| | | | |
|---|---|---|---|
| 7,980,590 B2* | 7/2011 | Foubert | B64D 11/062 |
| | | | 280/733 |
| 8,016,318 B2* | 9/2011 | Nezaki | B60N 2/688 |
| | | | 280/733 |
| 9,944,245 B2 | 4/2018 | Moeller et al. | |
| 10,144,381 B2 | 12/2018 | Faruque et al. | |
| 10,315,619 B2* | 6/2019 | Farooq | B60R 22/48 |
| 10,391,970 B2* | 8/2019 | Barbat | B60R 22/26 |
| 2004/0251675 A1* | 12/2004 | Herberg | B60R 22/1951 |
| | | | 280/806 |
| 2005/0073187 A1* | 4/2005 | Frank | B60R 22/02 |
| | | | 297/484 |
| 2005/0206152 A1* | 9/2005 | Delventhal | B60R 21/01558 |
| | | | 280/805 |
| 2009/0256337 A1* | 10/2009 | Pan | B60R 21/18 |
| | | | 280/733 |
| 2010/0025972 A1 | 2/2010 | Nezaki | |
| 2019/0071051 A1* | 3/2019 | Board | B60N 2/04 |
| 2020/0254953 A1* | 8/2020 | Jessup | B60R 22/023 |

* cited by examiner

VEHICLE SEAT ASSEMBLY

BACKGROUND

A vehicle may include seats that are rotatable during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between forward-facing and rearward-facing positions. The seats may include seat belts for belting an occupant to the seat. In examples where the seat is rotatable, the seat belt may restrain movement of the occupant in multiple seat positions.

DETAILED DESCRIPTION

Figure 1:
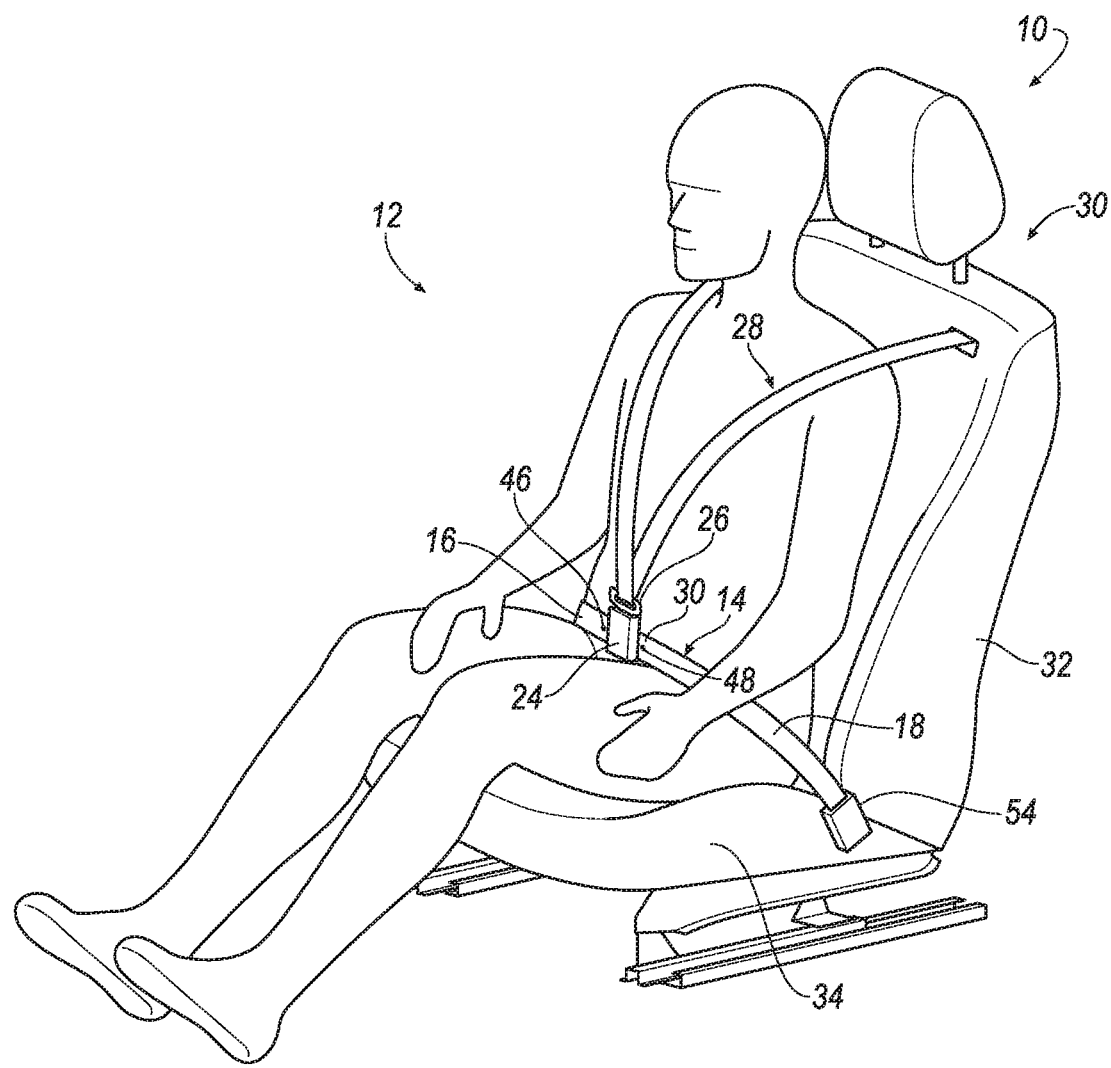
FIG. 1 is a perspective view of a vehicle seat.

An assembly includes a belt and one of a buckle or a clip. The belt has a first inflatable portion inflatable to an inflated position, a second inflatable portion inflatable to an inflated position, and an intermediate portion between the first inflatable portion and the second inflatable portion. The intermediate portion includes a fluid channel connecting the first inflatable portion to the second inflatable portion. One of the buckle or the clip is slidably attached to the intermediate portion.

The assembly may further include a shoulder belt extending through the one of the buckle or the clip, wherein the belt is a lap belt.

The shoulder belt may be inflatable to an inflated position.

The assembly may further include the other of the buckle or the clip, the other of the buckle or the clip defining a slot sized to allow the shoulder belt to inflate within the slot, the clip being releasably engageable with the buckle.

The assembly may further include a first retractor and a second retractor, the belt being retractably extendable from the first retractor and the shoulder belt being retractably extendable from the second retractor.

The assembly may further include a seat and a retractor mounted to the seat, the shoulder belt having a first end engaged with the retractor and a second end fixed to the seat.

The assembly may further include a second buckle or a second clip releasably engageable with each other, one of a second buckle or second clip attached to the belt.

The assembly may further include an inflator in fluid communication with the first inflatable portion through the other of the second buckle or the second clip.

The assembly may further include a first stop between the first inflatable portion and the intermediate portion and a second stop between the second inflatable portion and the intermediate portion, wherein the buckle is slidable between the first stop and the second stop.

The one of the buckle or the clip may define a slot and the intermediate portion may extend through the slot.

The slot may be sized to allow the fluid channel to inflate.

The belt may be elongated along a longitudinal axis, the first inflatable portion and the second inflatable portion being inflatable to an inflated position having a thickness perpendicular to the longitudinal axis greater than a thickness of the intermediate portion.

The assembly may further include a tube disposed in the fluid channel extending from the first inflatable portion to the second inflatable portion.

A seat includes a back and a bottom. A retractor and a side buckle are mounted to the bottom. A second retractor is mounted to the back. A lap belt is retractably extendable from the retractor to the side buckle and inflatable to an inflated position. A shoulder belt is retractably extendable from the second retractor and inflatable to an inflated position. One of a buckle or a clip is slidably connected to the lap belt and engageable with the shoulder belt.

The seat may further include an inflator mounted to the bottom and in fluid communication with the lap belt.

The seat may further include an anchor point disposed on the back, wherein the shoulder belt extends from the second retractor to the anchor point.

The lap belt may be elongated along a longitudinal axis and may include a first portion and an intermediate portion, the first portion having a thickness perpendicular to the longitudinal axis greater than a thickness of the intermediate portion, and one of the buckle or the clip is slidably connected to the intermediate portion.

The shoulder belt may include the other of the clip and the buckle.

With reference to the Figures, wherein like numerals indicate like parts throughout the several views, an assembly 10 in a vehicle 12 includes a belt 14 and one of a buckle 24 or a clip 26. The belt 14 has a first inflatable portion 16 inflatable to an inflated position, a second inflatable portion 18 inflatable to an inflated position, and an intermediate portion 20 between the first inflatable portion 16 and the second inflatable portion 18. The intermediate portion 20 includes a fluid channel 22 connecting the first inflatable portion 16 to the second inflatable portion 18. The buckle 24 or the clip 26 is slidably attached to the intermediate portion 20.

The intermediate portion 20 between the first inflatable portion 16 and the second inflatable portion 18 allows one of the buckle 24 or the clip 26 to slide along the intermediate portion 20 and allows inflation medium (e.g., from an inflator 68 as described below) to flow from the first inflatable portion 16 to the second inflatable portion 18. Because the first inflatable portion 16 and the second inflatable portion 18 are fluidly connected by the intermediate portion 20, a single inflator 68 can inflate both the first inflatable portion 16 and the second inflatable portion 18. In an example in which the seat 30 is a rotatable seat, the belt 14 absorbs energy from the occupant when the seat 30 is directed away from a vehicle-forward direction.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

As shown in FIGS. 1-3, 5-6. the vehicle 12 includes the seat 30. The seat 30 includes a seat back 32, as shown in FIGS. 1-3, 5, and a seat bottom 34, as shown in FIGS. 1-3, 6. The seat back 32 may be supported by the bottom 34 and may be stationary or movable relative to the seat bottom 34. The seat back 32 and/or the seat bottom 34 may be adjustable in multiple degrees of freedom. Specifically, the seat back 32 and/or the seat bottom 34 may themselves be adjustable, in other words, adjustable components within the seat back 32 and/or the seat bottom 34 may be adjustable relative to each other. The seat 30 may be a rotatable seat 30, i.e., rotatable about a vertical axis to a position away from the vehicle-forward direction.

The assembly 10 includes the belt 14, as shown in FIG. 1-4, 6. The belt 14 may be a lap belt. The belt 14 includes the first inflatable portion 16, the second inflatable portion 18, and the intermediate portion 20. The first inflatable portion 16 is inflatable to the inflated position. The second inflatable portion 18 is inflated to the inflated position. The intermediate portion 20 is between the first inflatable portion 16 and the second inflatable portion 18. The belt 14 may be elongated along a longitudinal axis A, and the first inflatable portion 16 and the second inflatable portion 18 may, in the inflated position, each have a thickness perpendicular to the longitudinal axis A greater than a thickness of the intermediate portion 20. That is, the intermediate portion 20 inflates less than the inflatable portions 16, 18 to allow the buckle 24 and/or the clip 26 to slide relative to the intermediate portion 20.

Figure 2:
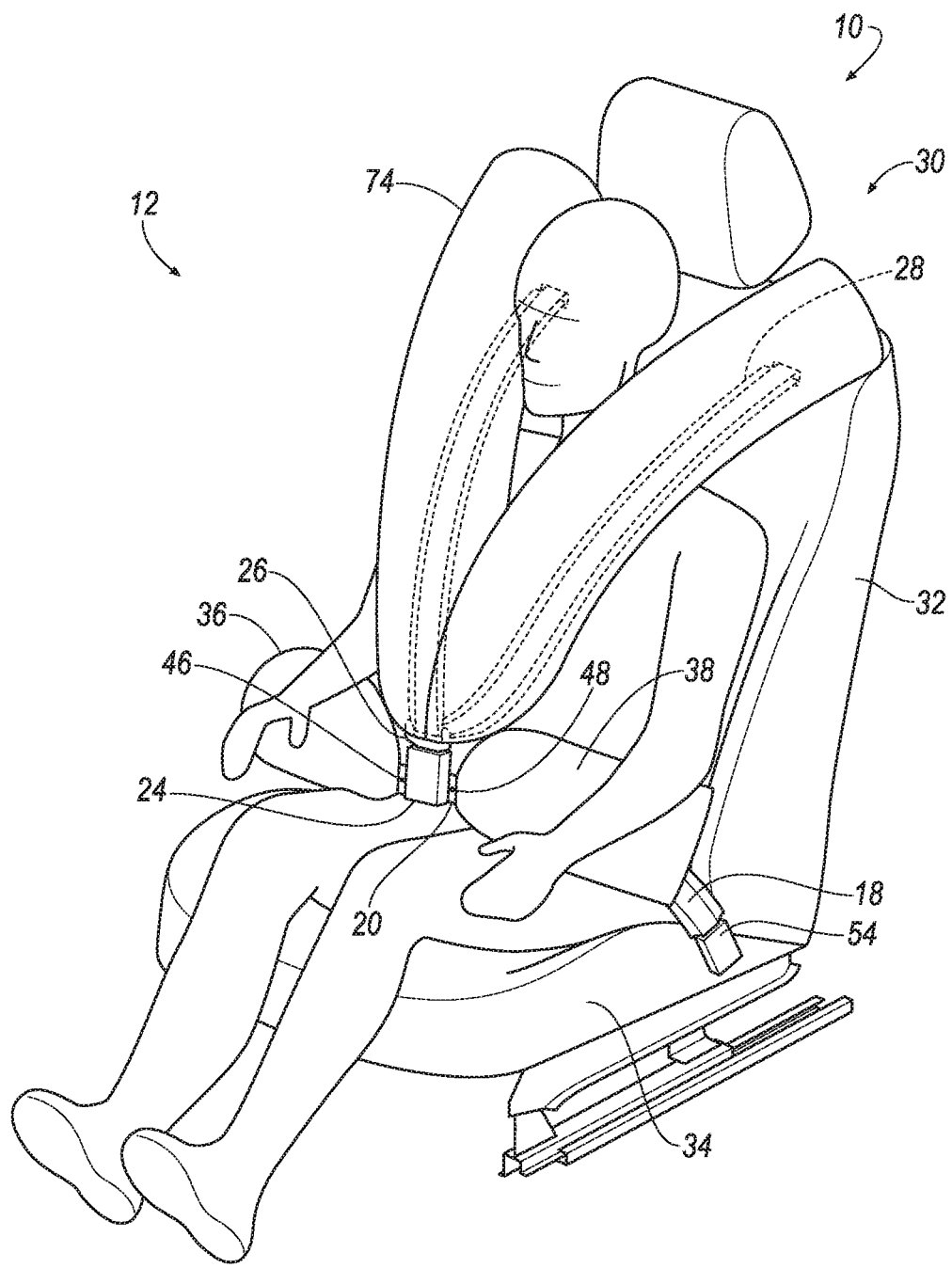
FIG. 2 is a perspective view of the vehicle seat with inflatable portions of a lap belt in respective inflated positions.

The first inflatable portion 16 may include a first airbag 36 inflatable to an inflated position, as shown in FIG. 2. The first airbag 36 may be disposed in a webbing of the belt 14. During inflation of the first airbag 36 to the inflated position, the first airbag 36 may break a seal of the webbing to expand out from the webbing. Expanding out from the webbing provides a surface that absorbs energy from the occupant during the vehicle impact. As another example, the first inflatable portion 16 may be an inflatable webbing, i.e., webbing that is inflatable to an inflated position to provide a surface to absorb energy from the occupant during the vehicle impact. The inflatable webbing may be folded beneath a seam and, during the vehicle impact, the inflated webbing may break the seam to provide the surface to absorb energy.

The second inflatable portion 18 may include a second airbag 38 inflatable to an inflated position, as shown in FIG. 2. The second airbag 38 may be disposed in the webbing of the belt 14. Upon inflation, the second airbag 38 may break a seal of the webbing to inflate to the inflated position. As another example, the second inflatable portion 18 may be a portion of the inflatable webbing to absorb energy from the occupant during the vehicle impact.

Figure 4:
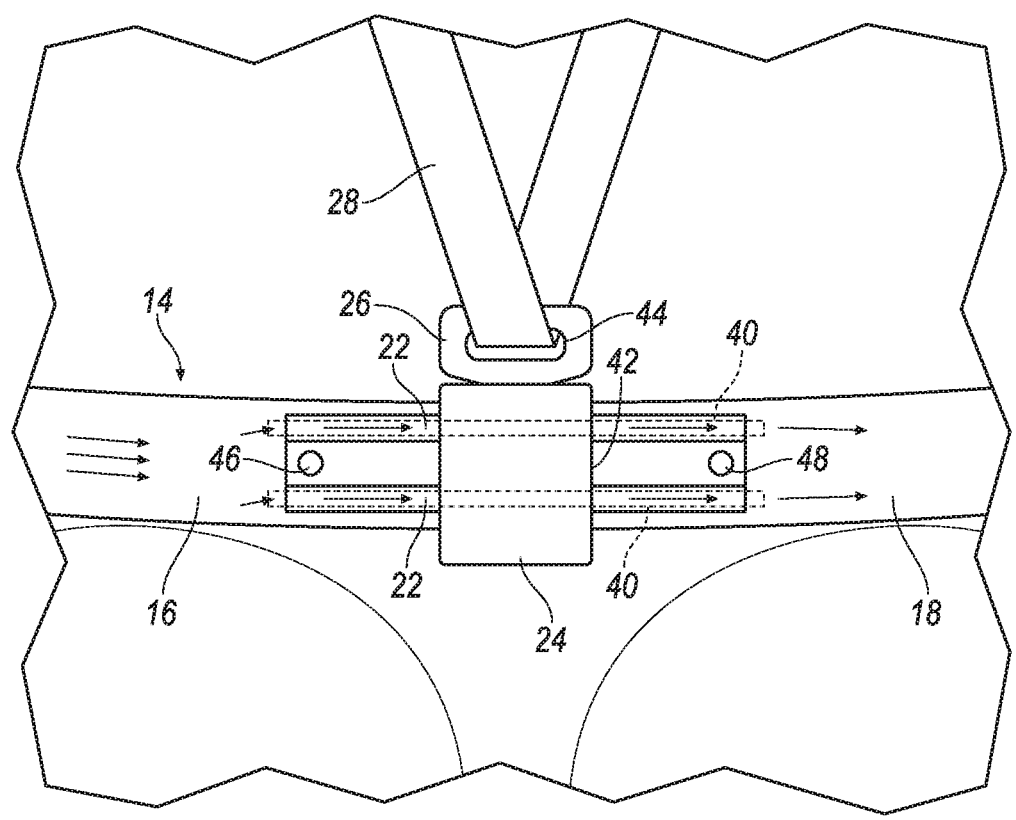
FIG. 4 is a front view of inflatable portions of the lap belt.

The intermediate portion 20 may include at least one fluid channel 22, as shown in FIG. 4. FIG. 4 shows two fluid channels 22, and the intermediate portion 20 may have a suitable number of fluid channels 22. The fluid channel 22 may connect the first inflatable portion 16 and the second inflatable portion 18. The fluid channel 22 may be a portion of the webbing of the intermediate portion 20 that defines a cavity through which inflation medium flows from the first inflatable portion 16 to the second inflatable portion 18. The fluid channel 22 may include a tube 40 fluidly connecting the first inflatable portion 16 to the second inflatable portion 18. For example, the tube 40 may extend from the first airbag 36 to the second airbag 38, and inflation medium may move from the first airbag 36 to the second airbag 38 during the impact. During the vehicle impact, inflation medium flows may flow from the first inflatable portion 16 through the fluid channel 22 to the second inflatable portion 18, inflating the first and second inflatable portions 16, 18 to the respective inflated positions.

The assembly 10 includes a shoulder belt 28, as shown in FIGS. 1-5. The shoulder belt 28 extends across an upper torso of an occupant of the seat 30. The shoulder belt 28 is inflatable to an inflated position. That is, the shoulder belt 28 may include one or more airbags 74 inflatable to an inflated position during the impact. Alternatively, the shoulder belt 28 may include an inflatable webbing. The shoulder belt 28 is connectable to the belt 14 to form a multi-point harness. For example, as shown in FIGS. 1-4, the shoulder belt 28 and the belt 14 may form a four-point harness having four attachment points to the seat 30, i.e., the shoulder belt 28 is attached to the seat 30 at two locations, e.g., opposing sides of the seat back 32, and the belt 14 is attached to the seat 30 at two locations, e.g., opposing sides of the seat bottom 34, providing four attachment points to absorb energy from the occupant. Alternatively, not shown in the Figures, the shoulder belt 28 and the belt 14 may form a three-point harness having three attachment points to the seat 30, i.e., the shoulder belt 28 may be attached to the seat 30 at one location and may be attached to the belt 14 via the buckle 24 and the clip 26, and the belt 14 may be attached to the seat 30 at two locations, e.g., opposing sides of the seat bottom 34. In the three-point harness, the shoulder belt 28 may be folded around the clip 26 and secured with, e.g., stitching, a fastener, etc. to secure the shoulder belt 28 to the clip 26.

The assembly 10 includes the buckle 24 and the clip 26, as shown in FIGS. 1-4. The clip 26 is releasably engagable with the buckle 24. That is, the buckle 24 receives the clip 26 to secure the shoulder belt 28 to the belt 14, and the clip 26 is releasable from the buckle 24 to disconnect the shoulder belt 28 from the belt 14. For example, the buckle 24 may include a spring-loaded securing mechanism that secures the clip 26 to the buckle 24, and the buckle 24 may include a release that releases the securing mechanism and allows the clip 26 to be removed from the buckle 24. In FIGS. 1-4, the buckle 24 is slidably connected to the intermediate portion 20 of the belt 14, and the clip 26 is connected to the shoulder belt 28, such that the clip 26 of the shoulder belt 28 engages the buckle 24 of the belt 14. That is, the buckle 24 may move along the intermediate portion 20 to be positioned against the occupant in the seat 30, e.g., at a center torso of the occupant. Alternatively, not shown in the Figures, the clip 26 may be slidably connected to the intermediate portion 20 of the belt 14 and the buckle 24 may be connected to the shoulder belt 28. When the clip 26 engages the buckle 24, the shoulder belt 28 and the belt 14 may absorb energy from the occupant in the seat 30.

Figure 3:
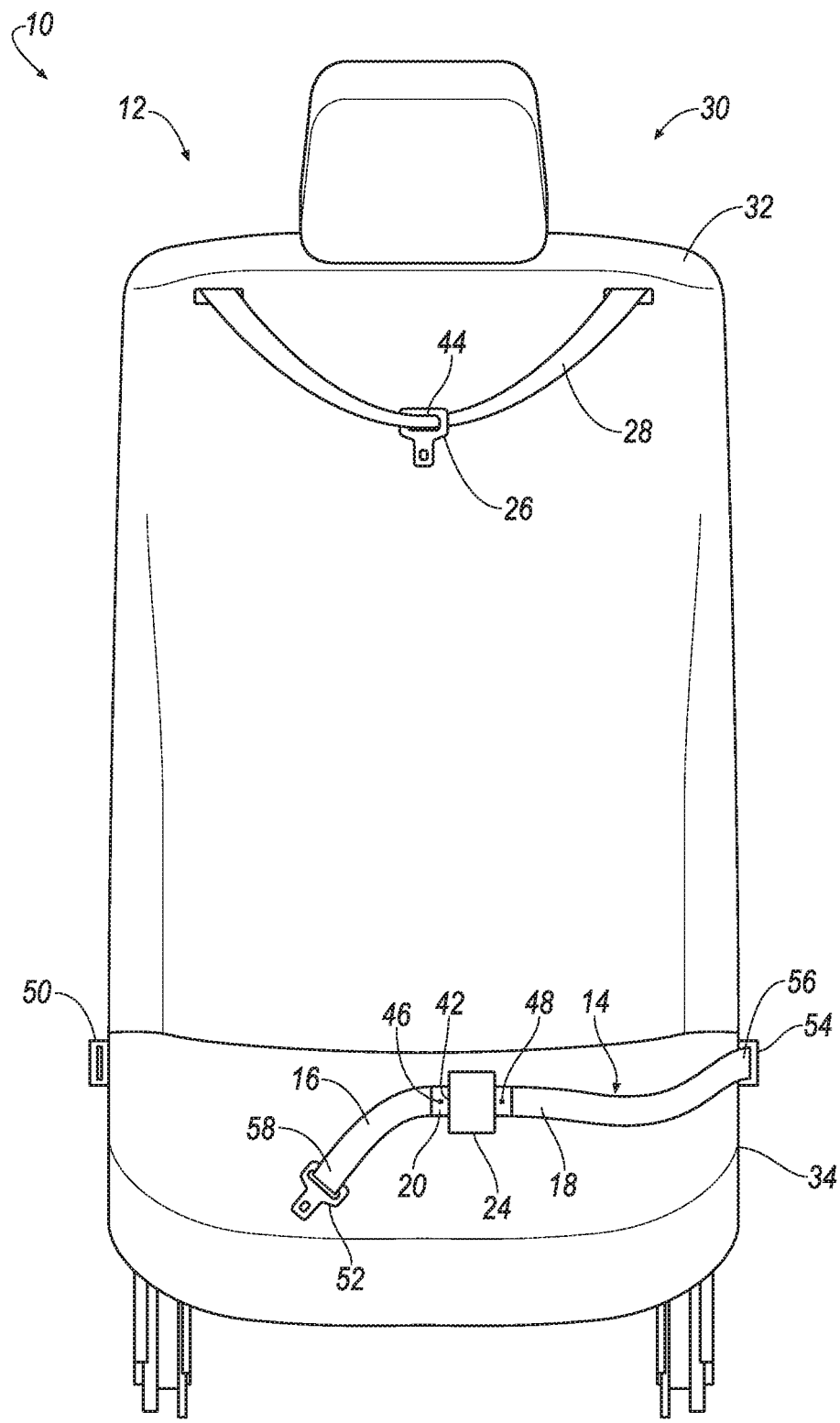
FIG. 3 is a front view of the vehicle seat with the lap belt unbuckled and partially extended from a retractor.

The buckle 24 defines a slot 42 and the clip 26 defines a slot 44, as shown in FIGS. 3-4. One of the buckle 24 or the clip 26 is slidably engaged with the belt 14, as described above. For example, as shown in FIGS. 1-4, the buckle 24 is slidably engaged with the intermediate portion 20 of the belt 14. The intermediate portion 20 of the belt 14 extends through one of the slots 42, 44. For example, as shown in FIG. 4, the intermediate portion 20 of the belt 14 extends through the slot 42 of the buckle 24. The slot 42 allows the buckle 24 to move along the intermediate portion 20. The slots 42, 44 may be sized to allow the fluid channels 22 to inflate. That is, during the vehicle impact, inflation medium flows from the first inflatable portion 14 through the fluid channels 22 to the second inflatable portion 16, inflating the fluid channels 22. The fluid channels 22 may expand during inflation, and the slots 42, 44 that receive the belt 14 may be sized to allow the fluid channels 22 to expand. The slots 42, 44 may be sized to allow the airbag 74 of the shoulder belt 28 to inflate and allow inflation medium to flow through the portion of the airbag 74 restricted by portion of the clip 26 defining the slot 44.

The belt 14 may include a first stop 46 and a second stop 48, as shown in FIG. 4. The first stop 46 may be disposed between the first inflatable portion 16 and the intermediate portion 20. The second stop 48 may be disposed between the second inflatable portion 18 and the intermediate portion 20. The buckle 24 may be slidable between the first stop 46 and the second stop 48. That is, the buckle 24 may slide along the intermediate portion 20 and may be stopped by the stops 46, 48, preventing the buckle 24 from sliding onto the first inflatable portion 16 or the second inflatable portion 18. For example, the stops 46, 48 may be sized greater than the slot 42 of the buckle 24 such that the stops 46, 48 prevent sliding of the buckle 24 past the respective stops 46, 48. The stops 46, 48 may be of any suitable type, e.g., pins, fasteners, etc. The fluid channels 22 may be positioned away from the stops 46, 48 to allow inflation medium to move through the fluid channels 22. For example, as shown in FIG. 4, the fluid channels 22 may be disposed close to an edge of the belt 14 than the stops 46, 48, and the stops 46, 48 may be disposed substantially in a middle of the belt 14 to engage the buckle 24.

The other of the buckle 24 and the clip 26 is connected to the shoulder belt 28, as shown in FIGS. 1-4. For example, in FIGS. 1-4, the clip 26 is connected to the shoulder belt 28. That is, the shoulder belt 28 extends through the respective slot 42, 44 of the other of the buckle 24 and the clip 26. The slot 42, 44 of the buckle 24 or the clip 26 that receives the shoulder belt 28 may be sized to allow the shoulder belt 28 to inflate to the inflated position within the slot 42, 44, as shown in FIG. 2.

Figure 6:
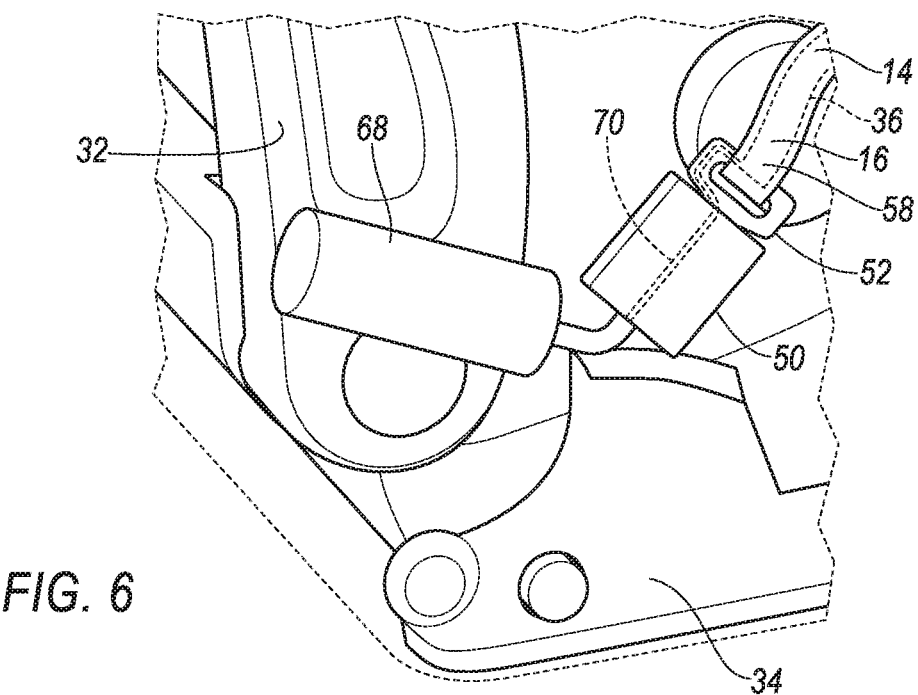
FIG. 6 is a perspective view of an inflator mounted to the seat.

The assembly 10 includes a second buckle 50 and a second clip 52, as shown in FIGS. 3 and 6. The second clip 52 is releasably engageable with the second buckle 50. One of the second buckle 50 or the second clip 52 may be fixed to the seat bottom 34, and the other of the second buckle 50 and the second clip 52 may be attached to the belt 14. For example, as shown in FIG. 3, the second clip 52 may be attached to the belt 14 and the second buckle 50 may be mounted to the seat bottom 34. That is, the second buckle 50 may be a side buckle that secures the belt 14 to a side of the seat bottom 34. Alternatively, the second buckle 50 may be mounted to any suitable portion of the seat 30, e.g., the seat back 32. When the second clip 52 engages the second buckle 50, the belt 14 absorbs energy from the occupant in the seat 30.

The assembly 10 may include a retractor 54, as shown in FIGS. 1-3. The retractor 54 may be mounted to the seat bottom 34. The belt 14 extends from the retractor 54. That is, the belt 14 has a first end 56 engaged with the retractor 54, and the occupant may pull on the belt 14 to unspool the belt 14 from the retractor 54. The belt 14 has a second end 58 engaged with one of the second buckle 50 or the second clip 52 mounted to the seat bottom 34. The belt 14 may thus be retractably extendable from the retractor 54 to the second buckle 50. That is, the occupant may pull the belt 14 from the retractor 54 and secured to the second buckle 50 and then release the belt 14 from the second buckle 50 and the retractor 54 can spool the belt 14.

Figure 5:
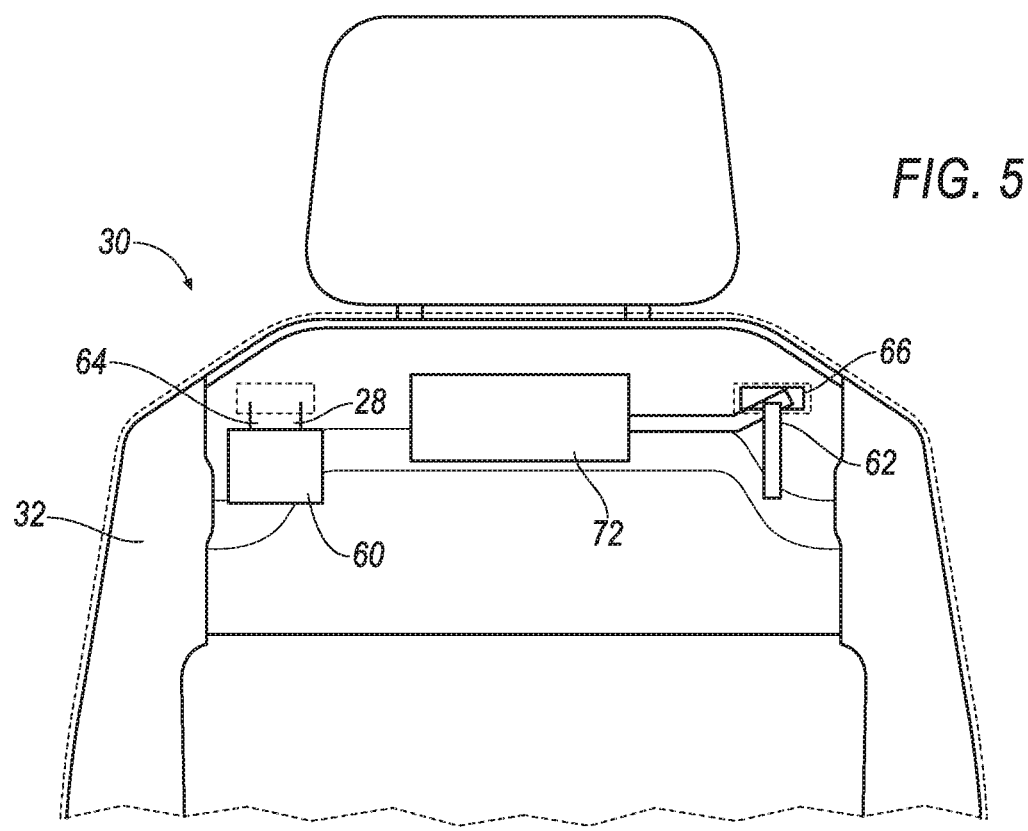
FIG. 5 is a rear view of the seat and a shoulder belt.

The assembly 10 may include a second retractor 60, as shown in FIG. 5. The second retractor 60 may be mounted to the seat back 32. The shoulder belt 28 may be extendable from the second retractor 60 to an anchor point 62 on the seat back 32. The anchor point 62 may be, e.g., a portion of the seat back 32 to which the shoulder belt 28 is fixed to the seat back 32 with, e.g., a fastener. For example, as shown in FIG. 5, the anchor point 62 is a fastener that secures the shoulder belt 28 to a portion of a frame of the seat back 32. The shoulder belt 28 has a first end 64 that may be engaged with the second retractor 60 and a second end 66 that may be fixed to the seat 30 at the anchor point 62. The shoulder belt 28 may thus be retractably extendable from the second retractor 60. The anchor point 62 may be fixed to the seat back 32 to secure the shoulder belt 28 to the seat 30. Alternatively, the second end 66 of the shoulder belt 28 may be fixed to a portion of the shoulder belt 28, e.g., wrapped about the slot 44 of the clip 26 and sewn to the portion of the shoulder belt 28.

The assembly 10 may include an inflator 68, as shown in FIG. 6. The inflator 68 may be mounted to one of the seat back 32 or the seat bottom 34. The inflator 68 may be in fluid communication with the belt 14. For example, the inflator 68 may be in fluid communication with the first inflatable portion 16. The inflator 68 may be in fluid communication with the belt 14 through the second buckle 50 and/or the second clip 52. That is, at least one of the second buckle 50 or the second clip 52 may include a channel 70 fluidly connecting the inflator 68 to the first inflatable portion 16. During the vehicle impact, the inflator 68 generates inflation medium that moves through the channel 70 into the first inflatable portion 16, through the fluid channel 22 of the intermediate portion 20, and into the second inflatable portion 18, inflating the inflatable portions 16, 18 to the inflated position. For example, the inflator 68 can generate inflation medium that moves through the channel 70 into the first airbag 36, inflating the first airbag 36, through the tube 40 in the intermediate portion 20 to the second airbag 38, inflating the second airbag 38 to the inflated position. The inflator 68 may be any suitable type, e.g., a cold-gas inflator.

The assembly 10 may include a second inflator 72, as shown in FIG. 5. The second inflator 72 may be mounted to the seat back 32. The second inflator 72 may be in fluid communication with the shoulder belt 28. That is, the second inflator 72 may provide inflation medium to the shoulder belt 28 to inflate the shoulder belt 28 to the inflated position during the vehicle impact. For example, the second inflator 72 may inflate the airbag 74 to the inflated position. In another example, when the shoulder belt 28 includes inflatable webbing, the second inflator 72 may inflate the inflatable webbing to the inflated position. The second inflator 72 may be any suitable type, e.g., a cold-gas inflator.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a lap belt having a first inflatable portion inflatable to an inflated position, a second inflatable portion inflatable to an inflated position, and an intermediate portion between the first inflatable portion and the second inflatable portion, the intermediate portion including a fluid channel connecting the first inflatable portion to the second inflatable portion;
   one of a buckle or a clip slidably attached to the intermediate portion; and
   a shoulder belt extending through the other of the buckle or the clip.

2. The assembly of claim 1, wherein the shoulder belt is inflatable to an inflated position.

3. The assembly of claim 2, further comprising the other of the buckle or the clip, the other of the buckle or the clip defining a slot sized to allow the shoulder belt to inflate within the slot, the clip being releasably engageable with the buckle.

4. The assembly of claim 1, further comprising a first retractor and a second retractor, the belt being retractably extendable from the first retractor and the shoulder belt being retractably extendable from the second retractor.

5. The assembly of claim 1, further comprising a seat and a retractor mounted to the seat, the shoulder belt having a first end engaged with the retractor and a second end fixed to the seat.

6. The assembly of claim 1, further comprising a second buckle and a second clip releasably engageable with each other, wherein the second clip is attached to the belt.

7. The assembly of claim 6, further comprising an inflator in fluid communication with the first inflatable portion through the other of the second buckle or the second clip.

8. The assembly of claim 1, further comprising a first stop between the first inflatable portion and the intermediate portion and a second stop between the second inflatable portion and the intermediate portion, wherein the buckle is slidable between the first stop and the second stop.

9. The assembly of claim 1, wherein the one of the buckle or the clip defines a slot and the intermediate portion extends through the slot.

10. The assembly of claim 9, wherein the slot is sized to allow the fluid channel to inflate.

11. The assembly of claim 1, wherein the belt is elongated along a longitudinal axis, the first inflatable portion and the second inflatable portion being inflatable to an inflated position having a thickness perpendicular to the longitudinal axis greater than a thickness of the intermediate portion.

12. The assembly of claim 1, further comprising a tube disposed in the fluid channel extending from the first inflatable portion to the second inflatable portion.

13. A seat, comprising:
a back and a bottom;
a retractor mounted to the bottom;
a side buckle mounted to the bottom;
a second retractor mounted to the back;
a lap belt retractably extendable from the retractor to the side buckle and inflatable to an inflated position;
a shoulder belt retractably extendable from the second retractor and inflatable to an inflated position; and
one of a buckle or a clip slidably connected to the lap belt and engageable with the shoulder belt.

14. The seat of claim 13, further comprising an inflator mounted to the bottom and in fluid communication with the lap belt.

15. The seat of claim 13, further comprising an anchor point disposed on the back, wherein the shoulder belt extends from the second retractor to the anchor point.

16. The seat of claim 13, wherein the lap belt is elongated along a longitudinal axis and includes a first portion and an intermediate portion, the first portion having a thickness perpendicular to the longitudinal axis greater than a thickness of the intermediate portion, and one of the buckle or the clip is slidably connected to the intermediate portion.

17. The seat of claim 13, wherein the shoulder belt includes the other of the clip and the buckle.

18. An assembly, comprising:
a belt having a first inflatable portion inflatable to an inflated position, a second inflatable portion inflatable to an inflated position, and an intermediate portion between the first inflatable portion and the second inflatable portion, the intermediate portion including a fluid channel connecting the first inflatable portion to the second inflatable portion;
a first stop between the first inflatable portion and the intermediate portion and a second stop between the second inflatable portion and the intermediate portion; and
one of a buckle or a clip slidably attached to the intermediate portion between the first stop and the second stop.

19. The assembly of claim 18, further comprising a shoulder belt extending through the other of the buckle or the clip, wherein the belt is a lap belt.

20. The assembly of claim 19, wherein the shoulder belt is inflatable to an inflated position.

* * * * *